(12) United States Patent
Spartano et al.

(10) Patent No.: US 10,206,263 B2
(45) Date of Patent: Feb. 12, 2019

(54) ELECTRONIC PROTECTION AGAINST CIRCUIT REVERSAL

(71) Applicant: Energizer Brands, LLC, Saint Louis, MO (US)

(72) Inventors: David Spartano, Brunswick, OH (US); Michael J. Brandon, North Ridgeville, OH (US); Zi hong Zhang, Shen Zhen (CN)

(73) Assignee: Energizer Brands, LLC, Saint Louis, MO (US)

( * ) Notice: Subject to any disclaimer, the term of this patent is extended or adjusted under 35 U.S.C. 154(b) by 0 days.

(21) Appl. No.: 15/279,870

(22) Filed: Sep. 29, 2016

(65) Prior Publication Data

US 2017/0094732 A1 Mar. 30, 2017

Related U.S. Application Data

(60) Provisional application No. 62/234,968, filed on Sep. 30, 2015.

(51) Int. Cl.
*H05B 33/08* (2006.01)
*H02J 9/06* (2006.01)
*H02J 7/00* (2006.01)

(52) U.S. Cl.
CPC .......... *H05B 33/089* (2013.01); *H02J 7/0026* (2013.01); *H02J 7/0034* (2013.01); *H02J 7/0063* (2013.01); *H02J 9/06* (2013.01)

(58) Field of Classification Search
CPC .... H05B 33/089; H02J 7/0026; H02J 7/0063; H02J 9/06
USPC ................................ 315/86, 120; 307/43, 85
See application file for complete search history.

(56) References Cited

U.S. PATENT DOCUMENTS

| | | | |
|---|---|---|---|
| 5,686,814 A | 11/1997 | Wierzbicki | |
| 7,030,591 B2 | 4/2006 | Stellberger | |
| 7,528,579 B2* | 5/2009 | Pacholok | H02J 7/022 320/130 |
| 7,649,323 B1* | 1/2010 | Kuhlmann | H05B 33/0803 315/200 A |
| 8,366,290 B2 | 2/2013 | Maglica | |
| 2014/0268455 A1* | 9/2014 | Gofman | H02H 3/18 361/84 |
| 2017/0005491 A1* | 1/2017 | Kyllonen | H02J 7/0021 |
| 2017/0005492 A1* | 1/2017 | Kyllonen | H02J 7/0026 |

* cited by examiner

*Primary Examiner* — Daniel D Chang
(74) *Attorney, Agent, or Firm* — Alston & Bird LLP

(57) ABSTRACT

A device having an active reversal protection system is described. The system includes a pair of MOSFETs connected to parallel battery power sources. When the batteries in one of the power sources are improperly installed, the voltage delivered by that power source closes the gate of its associated MOSFET. In normal operation, the MOSFETs are connected to a microprocessor configured to operate the device. In a preferred embodiment, the device is a lighting device incorporating a light emitting diode that is driven by the MOSFETs.

11 Claims, 1 Drawing Sheet

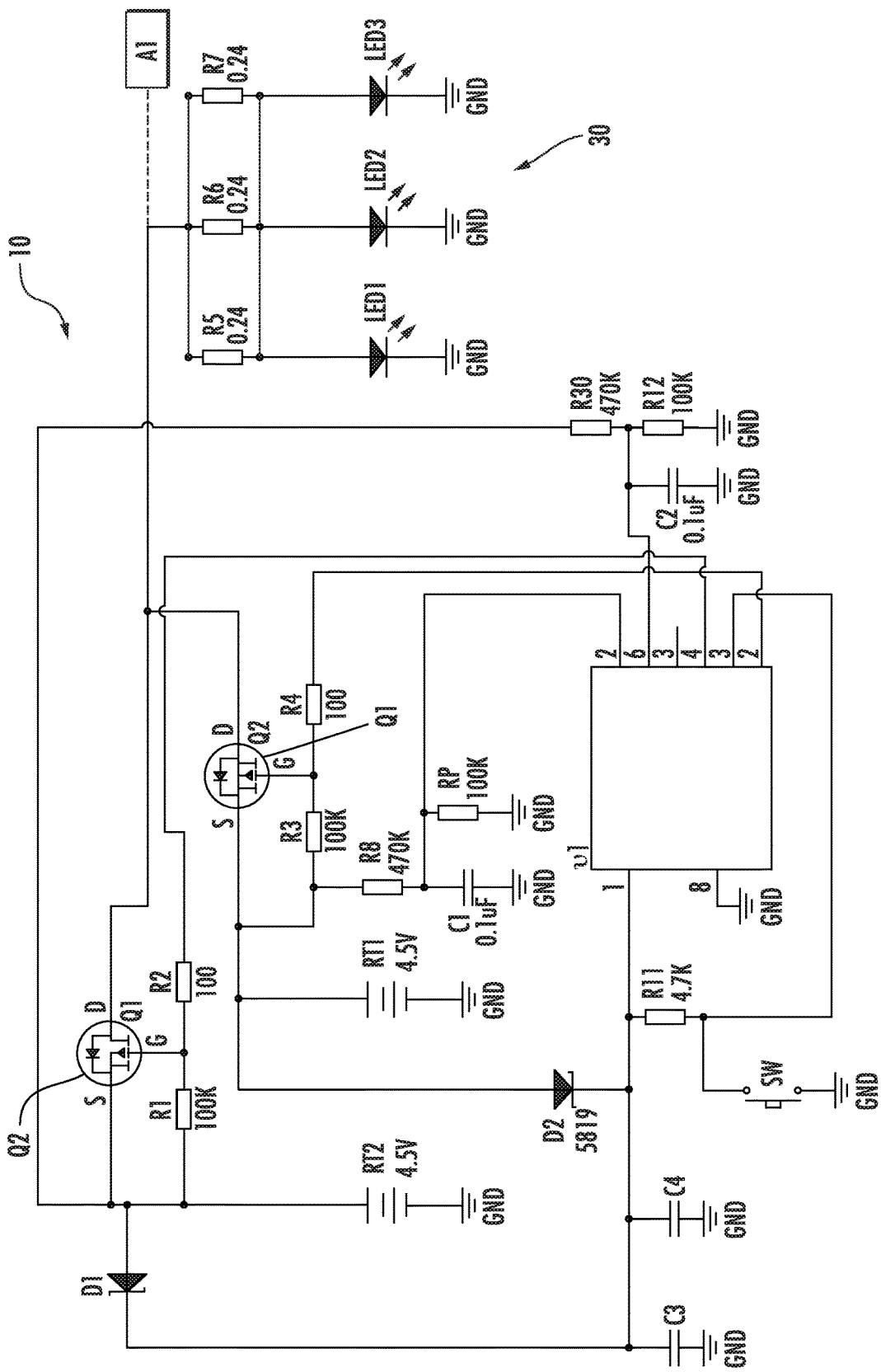

though it may also encompass a battery simply not making proper electrical contact. As a result, the power delivered to the device may not be of the correct voltage or amperage, which could lead to damage to the circuitry and/or malfunctioning or non-functioning of the device itself.

Consequently, device manufacturers may include protection schemes to guard against improper battery insertion. Owing to extraneous components, these schemes often increase the cost of the device.

One protection scheme is a simple mechanical solution in which the batteries are inserted into a separate part, such as a cartridge. In this approach, the part is designed so that it is not physically possible for the consumer to improperly align the batteries within the cartridge and then fit the cartridge back into the device itself. Drawbacks to this approach include the added volume/space for receiving the cartridge and the fact that the cartridge is a separate component which can be misplaced and/or broken by the consumer.

Electronic protection schemes are also contemplated. For example, Schottky diodes have been employed, although these devices cause a large reduction of current that would negatively impact any device whose output is dependent on current. Additionally, Schottky diodes are relatively large in comparison to some of the other solutions discussed below.

FIG. 8A of U.S. Pat. No. 8,366,290 shows a schematic diagram of a reverse battery protection circuit. A p-channel metal-oxide-semiconductor field-effect transistor ("PMOS") is connected between the internal voltage supply and the assembled circuit board of a flashlight. If a battery is installed in reverse order, no current will flow through the circuit to power the light emitting diode. In this protection scheme the device itself will not be powered if a battery is improperly installed. Also, subsequent circuitry is provided, in the form of a microcontroller and separate MOSFET driver, to operate the LED.

Another example of a charge, discharge and protection circuit is disclosed in U.S. Pat. No. 7,030,591. Here, a series of metal-oxide-semiconductor field-effect transistors ("MOSFETs") are employed in a cascading fashion between the battery and the load. This arrangement of MOSFETs in series allows for selective, switchable charging and discharging of rechargeable batteries separately connected to the circuit.

A further example of a battery circuit for supplying power to an electronic device is found in U.S. Pat. No. 5,686,814. First and second auxiliary circuits prevent unwanted charging and reverse voltage from being applied to a parallel battery sources. Specifically, both auxiliary circuits include a MOSFET in combination with an op amp in order to effectively cut off power in the event one of the batteries is improperly installed. This arrangement is best classified as passive the microprocessor has no control over the protection MOSFET.

ELECTRONIC PROTECTION AGAINST CIRCUIT REVERSAL

CROSS REFERENCE TO RELATED APPLICATIONS

The following application claims priority to U.S. Provisional Patent Application Ser. No. 62/234,968 filed on Sep. 30, 2015, the disclosure of which is incorporated by reference.

BACKGROUND OF INVENTION

Many electronic devices use consumer-replaceable batteries to power the device. Consumer-replaceable batteries are sold in standard sizes and voltages, with 1.5 volt, AA-sized zinc-manganese dioxide (i.e., alkaline) batteries being the most common primary battery. Other primary and secondary battery types found in the market today may take a variety of forms, from cylindrical (AA, AAA, C, D, etc.) to button or coin sized cells. The battery chemistry for such batteries is equally broad, including nickel-metal hydride, lithium-iron disulfide, lithium-manganese dioxide, zinc-air and carbon-zinc electrochemical systems, with the voltage for each dictated by the electrochemical reaction inherent thereto. Ultimately, most consumer-replaceable batteries output nominal, direct voltages of 1.5 or 3.0 volts. While some consumers prefer the reusability of secondary battery systems, primary battery systems usually provide superior performance characteristics. In any event, the foregoing demonstrates that consumer-replaceable batteries encompass a wide range of possibilities, and the International Electrotechnical Commission and the American National Standards Institute publish specifications for such batteries.

Devices powered by consumer-replaceable batteries include a wide range of different applications, although flashlights—and particularly flashlights utilizing at least one light emitting diode ("LED")—are perhaps the most ubiquitous. Other devices designed to rely on consumer-replaceable batteries may include infra-red or radio remote controllers, cameras, electronic locking devices and wireless sensors (e.g., temperature probes, motion detectors, smoke detectors and the like).

Device manufacturers prefer consumer-replaceable batteries for their low cost, convenience and familiarity. In order to best leverage the advantages of these batteries, manufacturers will design the circuitry in their devices accordingly. For example, the battery compartment for a device may include multiple batteries provided in series to increase the total voltage delivered to the device. Additionally or alternatively, manufacturers may provide multiple batteries in series to improve the overall current delivered. The precise number and orientation of the batteries is dictated by the design intent and load requirements of the device.

Reliance upon consumer-replaceable batteries creates the possibility for improper insertion of the batteries, particularly when multiple batteries are present. Improper insertion usually involves the consumer installing the battery with the polarity reversed (i.e., rather than placing the negative terminal with the negative contact in the device, the positive terminal is, instead, positioned next to the negative contact or vice versa), although it may also encompass a battery simply not making proper electrical contact. As a result, the power delivered to the device may not be of the correct

SUMMARY OF INVENTION

A circuit for active reversal protection in a device is provided. The reversal protection scheme is integrated with other essential elements for powering and operating the device. In certain embodiments, the circuit allows for continued operation of the device even when an improper installation is detected, as well as features to alert the user of the same.

In one embodiment, the active reversal protection system comprises any combination of the following: a first battery power source; a second battery power source; a microprocessor; a consumer device, a first MOSFET operatively associated with the first battery power source, the microprocessor and the consumer device; and a second MOSFET operatively associated with the second battery power source, the microprocessor and the consumer device. In operation, the first and second battery power sources are connected in parallel to the microprocessor and, when the first battery power source delivers voltage outside of a specified voltage range, the first MOSFET prevents electrical communication with the first power source while the second power source and the second MOSFET, by way of the microprocessor, continue to operate the consumer device. Additionally or alternatively, the microprocessor may provide an alert signal indicating improper installation of batteries in the first battery power source, such as a visual or audio alteration in an output normally delivered by the consumer device. In some embodiments, the consumer device is a lighting device, and the lighting device may comprise a light emitting diode. Further, the first and/or second battery power source may comprise a plurality of batteries provided in series.

In view of the foregoing, specific embodiments of the invention may comprise one or more of the following elements: a first battery power source; a second battery power source; a microprocessor; a consumer device; a first MOSFET operatively associated with the first battery power source, the microprocessor and the consumer device; a second MOSFET operatively associated with the second battery power source, the microprocessor and the consumer device; at least one light emitting diode; wherein the first and second battery power sources are connected in parallel to the microprocessor; wherein, when the first battery power source delivers voltage outside of a specified voltage range, the first MOSFET prevents electrical communication with the first power source while the second power source and the second MOSFET, by way of the microprocessor, continue to operate the consumer device; wherein the microprocessor provides an alert signal indicating improper installation of batteries in the first battery power source; wherein the alert signal is a visual or audio alteration in an output normally delivered by the consumer device; wherein the consumer device is a lighting device; wherein the lighting device comprises a light emitting diode; wherein the alert signal comprises a visual alteration of light output by the light emitting diode; wherein the first battery power source comprises a plurality of batteries provided in series; and wherein, when the consumer device demands a load outside of a specified load range, the first and second MOSFETs prevents electrical communication with the first and second power sources while allowing the microprocessor to provide an alert signal as to an overload condition.

DESCRIPTION OF DRAWINGS

In the drawings, reference numerals generally relate and represent similarly grouped components. Replacements and substitution of certain elements may be possible and apparent to a person of skill in the art. Any information, including numbers, symbols, and connections or other relations between the elements reflected in the drawings is expressly incorporated as if rewritten herein.

FIG. 1 is a schematic representation of one embodiment of the integrated, active reversal protection circuit as applied to a flashlight utilizing an array of LEDs.

DETAILED DESCRIPTION OF A PREFERRED EMBODIMENT

Referring to the drawings and disclosure herein, an "active" system for detecting improper, reversal of batteries is contemplated. The system is active insofar as it prevents unwanted charging of the batteries/power source while still allowing the device to continue to operate even if an improper installation is detected.

A particular embodiment of the system 10 is shown in FIG. 1. At least two separate batteries (or strings of batteries), BT1 and BT2, are provided in parallel to act as a power source for device 30. The batteries in each string may be provided in series to achieve the desired voltage for the power source, while the number of strings may be adjusted to provide the desired amperage or power. Of course, the batteries comprising BT1 and/or BT2 may also be provided in parallel so as to allow control of the amperage for each string. In all instances, the voltage and power will be dictated by the needs of the device operatively associated with the system.

BT1 and BT2 may each comprise three separate AAA sized batteries provided in series, although other numbers and battery sizes are contemplated. The batteries may be consumer-replaceable primary or secondary cells of any know battery chemistry.

Device 30 is optimally a lighting device, such as an array of three light emitting diodes LED1, LED2 and LED3, respectively associated with resistors R5, R6 and R7, as shown in FIG. 1. Other devices may be used with the invention, although it is believed to have particular applicability to lighting devices, and especially LED devices, insofar as these devices may be configured to use MOSFETs, microprocessors and/or other components, as described in more detail below.

The source terminal (S) of metal-oxide-semiconductor field-effect transistors Q1 and Q2 are respectively connected to BT2 and BT1. The drain terminal (D) of each MOSFET is connected to device 30. The operation of Q1 and Q2 will be discussed in greater detail below.

Resistors R1 and R10 are coupled to BT2 and resistors R3 and R10 are coupled to BT1. Additionally, resistors R2 and R4 are associated with the gate terminals of Q1 and Q2. Taken together, these resistors bias the gate of the MOSFETs, Q1 and Q2, so as keep the gate closed if a specified voltage is not delivered. Consequently, if a single battery provided in one of the two battery strings is improperly installed, the entire string will fail to deliver the anticipated voltage and the MOSFET will prevent any electrical communication with that particular string. With reference to the six battery configuration specifically described for FIG. 1, an improper installation of one AAA battery in BT1 would result in a nominal voltage of 1.5 volts, rather than 4.5 volts, thereby causing Q2 to remain closed.

Provided that the batteries are properly installed in the remaining string(s), voltage from the properly installed string flows through the MOSFET. In this manner, the circuit remains powered and allows for additional features via microprocessor U1. Notably, U1 is operative connected to MOSFETs Q1 and Q2 by way of a combination of capacitors C1, C2, C3 and C4, resistors R9, R11 and R12, switch SW and diodes D1 and D2. In effect, this permits microprocessor U1 to rely on the MOSFETs to enable further action on device 30. Specifically, U1 could pulse width modulate the signal, by way of Q1 and/or Q2, in order to dim or pulse the light output by device 30 as may be desired by the device manufacturer. In addition, should an improper installation cause the gate of either Q1 or Q2 to remain closed, the microprocessor U1 may be programmed to deliver an alert signal (e.g., directly by varying the light output of device 30 or by way of additional visual or audio devices, shown as element A1 in FIG. 1) to inform the user of the improper installation detection. In either scenario, the device would remain active and operable by way of the properly installed battery string(s), thereby allowing continued use of the device in conjunction with the desired reversal protection.

This arrangement also potentially provides overload protection by insuring the gate of the MOSFETs would close if the load demands of the device exceeded the designed capabilities of the system. Additional adjustments to the components may be advisable to the extent overload protection is a primary design intent.

In practice, the invention utilizes the MOSFETs both as reversal protection and as drivers for the LEDs. This arrangement reduces complexity, components and concomitant costs. While a p-channel MOSFET is illustrated in FIG. 1, it may be possible to incorporate other types of MOSFETs. The number of batteries and battery strings can also be adjusted, so long as corresponding MOSFETs and resistors are employed.

The active reversal protection provided by the invention described herein is expected to be particularly well suited to lighting devices relying on LEDs, insofar as such lights currently require the use of MOSFET drivers. Remote controllers, wireless sensors, smoke detectors, motion detectors, temperature probes, cameras and other similar devices are expressly (but not exclusively) contemplated. Additional or separate devices could be integrally controlled by the microprocessor while still benefiting from this reversal detection and protection arrangement. In the same manner, the microprocessor could be operatively associated with the device in order to permit additional functionality for the user of that device.

The consumer-replaceable batteries usable in this system encompass the entire range of chemistries and sizes in the market today. Cylindrical sizes are expected to be the primary beneficiaries of this system.

We claim:

1. A flashlight having active reversal protection comprising:
    a first battery power source;
    a second battery power source;
    a microprocessor;
    a lighting device configured to provide a normal operation light output;
    a first MOSFET operatively associated with the first battery power source, the microprocessor and the lighting device; and
    a second MOSFET operatively associated with the second battery power source, the microprocessor and the lighting device;
    wherein:
        the first and second battery power sources are connected in parallel to the microprocessor, and
        when a voltage delivered by the first battery power source is outside of a specified voltage range, (a) the first MOSFET prevents electrical communication with the first battery power source while the second battery power source and the second MOSFET, by way of the microprocessor, continue to operate the lighting device and (b) the microprocessor is programmed to cause the flashlight to provide a user perceivable alert signal indicating improper installation of batteries in the first battery power source, the alert signal provided by altering the normal operation light output delivered by the flashlight via operation of the flashlight using the second battery power source.

2. The flashlight according to claim 1, wherein the alert signal is a visual alteration in an output normally delivered by the lighting device.

3. The flashlight according to claim 1, wherein the lighting device comprises a light emitting diode.

4. The flashlight according to claim 3, wherein the alert signal comprises a visual alteration of light output by the light emitting diode.

5. The flashlight according to claim 4, wherein the first battery power source comprises a plurality of batteries provided in series.

6. The flashlight according to claim 1, wherein the first battery power source comprises a plurality of batteries provided in series.

7. A flashlight having active reversal protection comprising:
    a first battery power source;
    a second battery power source;
    a microprocessor;
    a lighting device configured to provide a normal operation light output;
    a first MOSFET operatively associated with the first battery power source, the microprocessor and the lighting device; and
    a second MOSFET operatively associated with the second battery power source, the microprocessor and the lighting device;
    wherein:
        the first and second MOSFET are connected in parallel to the microprocessor, and
        when a load demanded by the lighting device is outside of a specified load range, the first and second MOSFETs are configured to prevent electrical communication with the first and second battery power sources while allowing the microprocessor to cause the flashlight to provide a user perceivable alert signal indicating an overload condition, the alert signal provided by altering the normal operation light output delivered by the flashlight.

8. A flashlight including active reversal protection comprising:
    a first battery power source comprising at least one consumer-replaceable battery;
    a second battery power source comprising at least one consumer-replaceable battery;
    a microprocessor;
    at least one light emitting diode configured to provide a normal operation light output;
    a first MOSFET operatively associated with the first battery power source, the microprocessor and the light emitting diode; and
    a second MOSFET operatively associated with the second battery power source, the microprocessor and the light emitting diode;
    wherein:
        the first and second battery power sources are connected in parallel to the light emitting diode, and
        when a voltage delivered by the first battery power source is outside of a specified voltage range, (a) the first MOSFET prevents electrical communication with the first battery power source while the second battery power source and the second MOSFET continue to operate the flashlight and (b) the microprocessor is programmed to cause the at least one light emitting diode to provide a user perceivable alert signal, the alert signal provided by altering the normal operation light output delivered by the flashlight via operation of the at least one light emitting diode using the second battery power source.

9. The flashlight according to claim 8, wherein the alert signal comprises a visual alteration of light output by the light emitting diode.

10. The flashlight according to claim 9, wherein the first battery power source comprises a plurality of batteries provided in series.

11. The flashlight according to claim 8, wherein the first battery power source comprises a plurality of batteries provided in series.

\* \* \* \* \*